United States Patent [19]
Iwasaki

[11] Patent Number: 5,643,373
[45] Date of Patent: Jul. 1, 1997

[54] PNEUMATIC TIRE WITH PAIR OF GROOVES

[75] Inventor: Naoaki Iwasaki, Akashi, Japan

[73] Assignee: Sumitomo Rubber Industries, Ltd., Hyogo-ken, Japan

[21] Appl. No.: 365,946

[22] Filed: Dec. 29, 1994

[30] Foreign Application Priority Data

Dec. 29, 1993 [JP] Japan ................. 5-350694

[51] Int. Cl.$^6$ ................................. B60C 11/04
[52] U.S. Cl. ....................... 152/209 R; 152/454
[58] Field of Search ................. 152/209 R, 209 D, 152/454

[56] References Cited

U.S. PATENT DOCUMENTS

| | | | |
|---|---|---|---|
| 4,722,378 | 2/1988 | Carolla et al. | 152/209 R |
| 5,327,952 | 7/1994 | Glover et al. | 152/209 R |
| 5,337,815 | 8/1994 | Graas | 152/209 R |
| 5,435,365 | 7/1995 | Tanaka | 152/209 R |

FOREIGN PATENT DOCUMENTS

| | | | |
|---|---|---|---|
| 0503404 | 9/1992 | European Pat. Off. | |
| 593288 | 4/1994 | European Pat. Off. | 152/209 R |
| 0600177 | 6/1994 | European Pat. Off. | |
| 2608516 | 6/1988 | France | |
| 197806 | 7/1992 | Japan | 152/209 R |
| 51047407 | 6/1993 | Japan | |
| 357419 | 9/1931 | United Kingdom | 152/209 R |
| 0381365 | 10/1932 | United Kingdom | |

OTHER PUBLICATIONS

Boltze et al, New Ways To Combat Hydroplaning: Developing The Aquacontact, May 19–22, 1992.

*Primary Examiner*—Steven D. Maki
*Attorney, Agent, or Firm*—Birch, Stewart, Kolasch & Birch, LLP

[57] ABSTRACT

A pneumatic tire having an improved tread profile capable of improving wet grip and running noise without sacrificing dry grip. The tread portion is provided with a pair of circumferential grooves to divide the tread portion into a central portion and a pair of shoulder portions. The contour of the central portion comprises a central face defined by a convex curve and a pair of side faces each defined by a concave curve. Each of the side faces extends axially outwardly and radially inwardly from each axial edges of the central face towards the bottom of the adjacent circumferential groove. The side faces intersects the central face to form an angle of less than 180 degrees. In a standard condition in which the tire is mounted on a standard rim, and inflated to 70% of the maximum air pressure, and loaded with 70% of the maximum load, the ground contacting width of the central portion is not greater than the axial width between the axial edges of the central face.

9 Claims, 9 Drawing Sheets

PNEUMATIC TIRE WITH PAIR OF GROOVES

The present invention relates to a pneumatic tire having an improved tread profile capable of improving the wet grip performance and tire noise while maintaining the dry grip performance.

In recent years, as the expressway network is developed and the vehicle performance is remarkably improved, a tread pattern which includes circumferentially extending straight or generally straight wide main grooves, has been widely used for its superior drainage performance. In the ground contacting patch, air tubes are formed between the ground and circumferential grooves. As a result, the air existing in the tube is excited by impact sound, vibrations, pulsative air flow and the like, and the air resonates at a certain frequency (about 800 to 1250 Hz) to generate so called air resonance noise.

If the volume of circumferential groove and/or the number of the circumferential grooves are decreased, such a resonance noise can be reduced, but wet performances are greatly decreased. If the volume and number of the circumferential grooves are increased, wet performances such as wet grip are improved, but the dry grip performance and steering stability are liable to decrease.

In order to solve these problems, in Japanese patent application laid open No. JP-A-6-127215 (appln. No. 4-802955), a pneumatic tire having a novel tread profile shown in FIG. 11 has been proposed, wherein the tread portion is divided by two cumferential grooves (e) into a central portion (j) and two shoulder portions (k); the central portion (j) has a contour (h) defined by a convex curve (g) extending continuously between the edges (f) of the groove bottoms, whereby the drainage is improved to prevent the occurence of aquaplane phenomenon and the wet grip performance is improved.

In this proposal, however, as the contour (h) is defined by a single convex curve, if the tread wear is progressed, the groove width of the circumferential groove (e) is greatly decreased, in other words, the decrease in the groove volume is accelerated, and wet performances such as the resistance to aquaplaning and wet grip performance are greatly decreased.

It is therefore, an object of the present invention to provide a pneumatic tire in which wet performances improved by the above-mentioned proposition are maintained, even if the tread wear is progressed, without sacrificing other performances such as dry grip, running noise and the like.

According to one aspect of the present invention, a pneumatic tire comprises a tread portion, the tread portion provided with a pair of circumferential grooves extending substantially continuously in the circumferential direction of the tire, each circumferential groove disposed on each side of the tire equator to divide the tread portion into a central portion between the circumferential grooves and a pair of shoulder portions axially outwards of the circumferential grooves, the contour of the central portion comprising a central face defined by a continuous convex curve having axial edges and a pair of side faces each defined by a continuous concave curve, each of the side faces extending axially outwardly and radially inwardly from each axial edges of the central face towards the bottom of the adjacent circumferential groove, the side faces intersecting the convex central face at the axial edges to form an angle of less than 180 degrees, in a standard condition in which the tire is mounted on a standard rim, and inflated to 70% of the maximum air pressure, and loaded with 70% of the maximum load, the ground contacting width of the central portion being not greater than the axial width between the axial edges of the central face.

Here, the standard rim is the rim officially approved for the tire by, for example JATMA (Japan), TRA (U.S.A.), ETRTO (Europe) and the like. Also the maximum air pressure and maximum tire load are those officially specified by the same association or organization.

Therefore, the volume of the circumferential grooves is increased to improve the drainage, and aquaplaning phenomenon is prevented to improve the wet grip performance.

Further, a sufficient ground contacting area can be obtained to maintain the dry grip performance. Furthermore, in a foot print, the circumferential groove changes its width along its longitudinal direction such that the width is minimum in the center and becomes wider towards both ends thereof as shown in FIG. 8. That is, the above-mentioned air tube changes its sectional area and shape. Accordingly, the resonance mode becomes complex. As a result, the resonance is hardly occurred and the air resonance noise can be reduced.

Even if the tread wear makes progress, the convex side faces decreases the change in the width of the circumferential groove, which prevents the resistance to aquaplaning performance from being decreased.

An embodiment of the present invention will now be described in detail in conjunction with the accompanying drawings.

Figure 1:
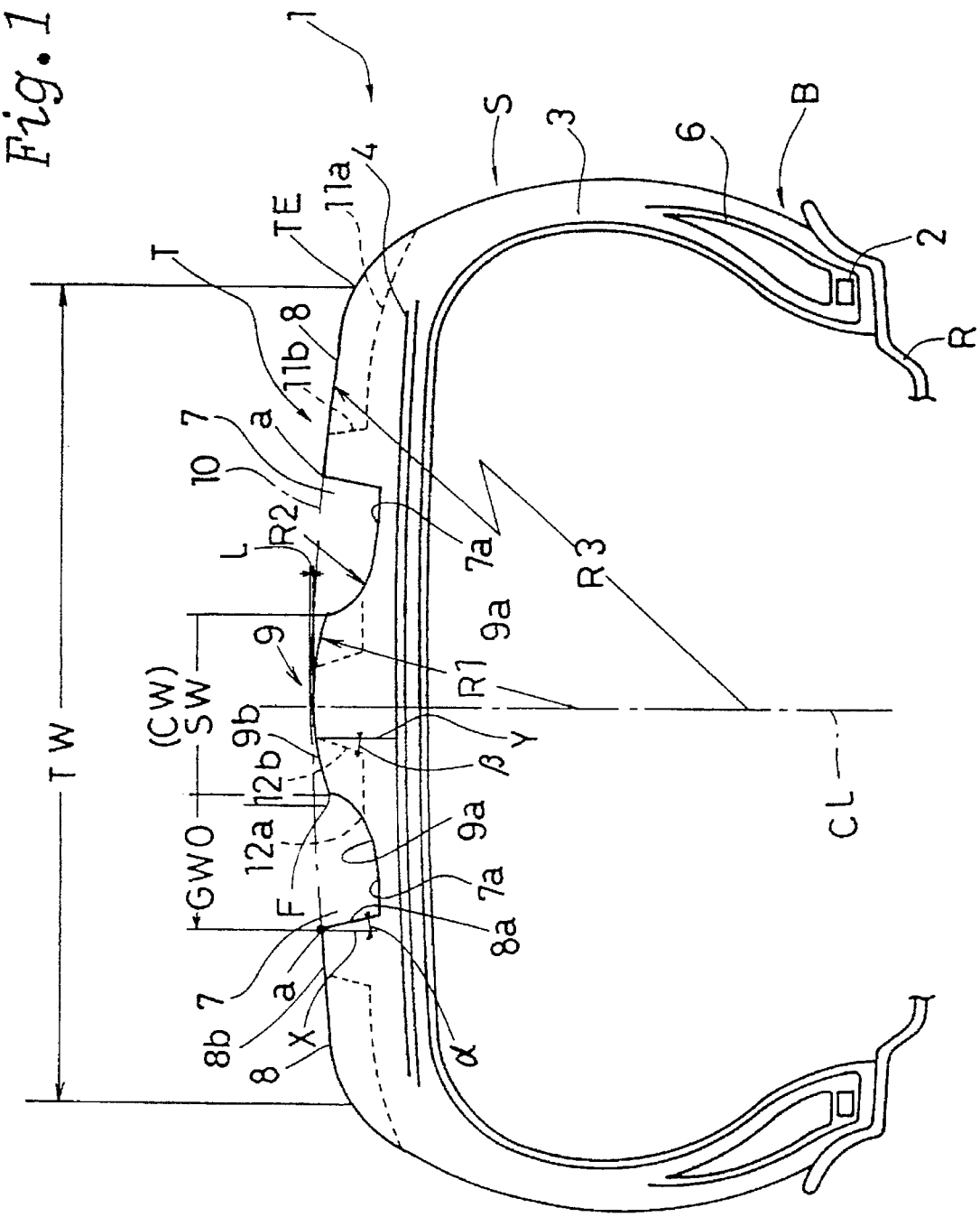
FIG. 1 is a cross sectional view of an embodiment of the present invention.

In FIG. 1, a tire 1 according to the present invention is a passenger radial tire having a low aspect ratio, and the tire is mounted on a standard rim R and inflated to 70% of the maximum air pressure.

The aspect ratio, which is a ratio of the tire section height to the tire section width, is 0.4 to 0.6.

The tire 1 comprises a tread portion (T), a pair of axially spaced bead portions (B), a pair of sidewall portions (S) extending between the tread edges (TE) and the bead portions (B), a pair of bead cores 2 each disposed in each of the bead portions (B), a carcass 3 extending between the bead portions (B), and a belt 4 disposed radially outside the carcass 3 and inside the tread portion T.

The carcass 3 comprises at least one ply of radially arranged cords extending between the bead portions and turned up around the bead cores 2 in the bead portion (B) from the axially inside to outside of the tire.

For the carcass cords, organic fiber cords, e.g. polyester, nylon, rayon and the like are preferably used in case of a passenger tire.

Between each turnup portion and the main portion thereof, a bead apex 6 made of hard rubber extending radially outwardly from the bead core 2 is disposed to increase the bead rigidity.

The belt 4 in this embodiment comprises cross plies, each made of high modulus cords, e.g. steel, aromatic polyamide and the like, laid at an angle of from 15 to 30 degrees with respect to the tire circumferential direction.

The tread portion (T) is provided on each side of the tire equator CL with a pair of circumferential grooves 7 and 7, each extending substantially continuously in the circumferential direction of the tire, whereby the tread portion (T) is divided into a central portion 9 between the circumferential grooves 7 and 7 and a pair of shoulder portions 8 axially outwards of the circumferential grooves 7 and 7. In this embodiment, the circumferential grooves 7 are a straight groove. However, in order to provide more traction, it may be possible to use a zigzag configuration in the groove sidewall 8a. Preferably, each circumferential groove 7 is disposed in the center between the tire equator CL and the tread edge TE or the edge of the tread ground contacting width TW.

In a meridian section of the tire, i.e., a tire section including the tire axis, the contour of the shoulder portion 8 is defined by a top face 8b and an axially inner side face 8a.

The side face 8a extends radially outwardly from the axially outer edge of the bottom 7a of each circumferential groove 7 in a non-arc fashion, for example straight, inclining at an angle (alpha) of 0 to 40 degrees, preferably 5 to 25 degrees with respect to a radial line X, so as to form an edged corner (a) between the inner side face 8a and the top face. The top face 8b extends axially outwardly from the edge corner (a), and the radius of curvature R3 thereof is preferably not less than 3 times the tread width TW or the overall ground contacting width of the tread portion (T). The center of the radius of curvature R3 is disposed on the tire equator CL. If the radius R3 is small, the steering stability during cornering and dry grip performance are decreased. The larger radius is more preferable, and the upper limit is infinite, that is, the top face can be straight in parallel to the tire axis.

As the edged corner (a) is provided in the shoulder portion 8 whose ground pressure is high, the cornering power is increased to maintain the dry grip performance.

The contour of the central portion 9 is defined by a pair of concave side faces 9a and 9a and a convex central face 9b therebetween.

Each concave side face 9a extends axially inwardly and radially outwardly from the axially inner edge of the bottom 7a of each circumferential groove 7. The convex central face 9b extends between the axially inner edges (F) of the side faces 9a and 9a.

The central face 9b is defined by an arc having a radius of curvature R1. The radius R1 is smaller than the radius of curvature R3 of the shoulder portions 8, and preferably in the range of from 0.5 to 1.5 times the tread width TW.

If R1 is less than 0.5 times TW, the ground contacting width CW of the central portion 9 decreases, and the dry grip performance is liable to deteriorated. If R1 is greater than 1.5 times TW, the drainage becomes insufficient and the wet grip is decreased. In this embodiment, the central face 9b has a single radius R1, and the center is disposed on the tire equator CL.

The above-mentioned side face 9a has a radius of curvature R2. The radius of curvature R2 is preferably in the range of from 0.05 to 0.5 times the tread width TW.

If R2 is less than 0.05 times TW, the rigidity of the central portion 9 is liable to decrease. If R2 is more than 0.5 times TW, the decrease in the circumferential groove width due to tread wear is liable to become greater.

The side faces 9a intersects the central face 9b at the axial edges (F) to form an angle of less than 180 degrees, preferably 120 +−15 degrees, whereby an edged corner is formed.

The height of the central portion 9 is such that the convex central face 9b substantially inscribes an imaginary line 10 which is drawn, smoothly connecting the top faces 8b of the shoulder portions 8 with each other. The imaginary line 10 is a straight line or a convex line having a single radius of curvature extending between the edges (a) of the shoulder portions 8 and being tangential to the top face 8b at the edge (a). Here, the phrase "substantially inscribe" means that the distance (L) between the imaginary line 10 and the central face 9b at the tire equator CL is within the range of not more than 2% of the tread width TW. If the distance (L) is not less than 2%, the ground pressure difference between the central portion and the shoulder portions becomes large, and the grip performance and wear resistance are deteriorated.

In order to maintain the dry grip, wear resistance, steering stability and the like, in the above-mentioned standard condition, the axial width SW of the central face 9b between the edged corners (F) is set in the range of from 5 to 40%, preferably 15 to 35% of the tread width TW.

In this embodiment, further, the ground contacting width CW of the central portion 9 is the same as the width SW of the central face 9b. In other words, the whole width between the edged corners (F) contacts with the ground. However, it is possible that the ground contacting width CW is smaller that the width SW. In other words, the edged corners (F) located axially outward of the edges of the ground contacting width CW.

Figure 3:
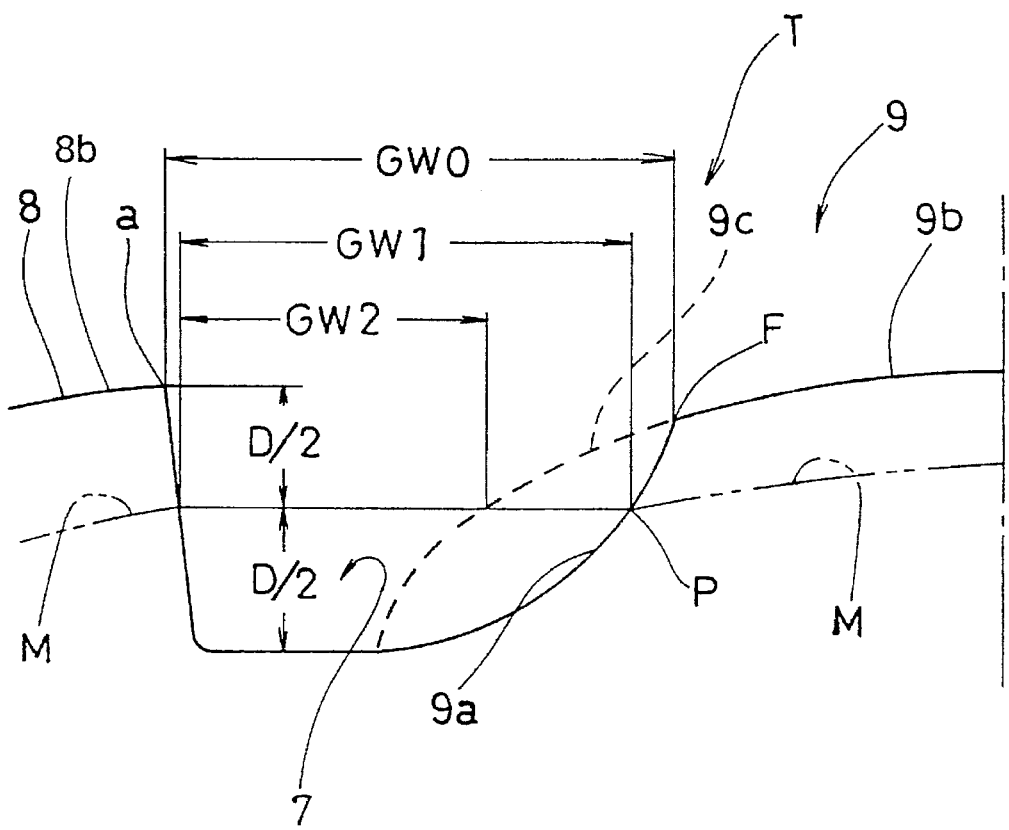
FIG. 3 is an enlarged partial cross sectional view of the tread portion.
Figure 11:
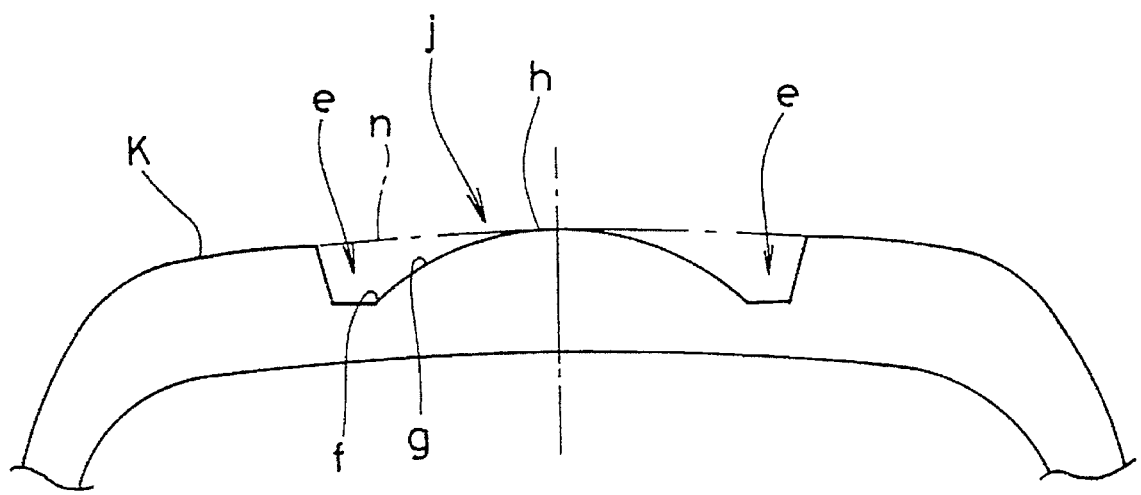
FIG. 11 is a cross sectional view showing the tread profile disclosed in Japanese patent application laid open No. JP-A-6-127218.

As shown in FIG. 3, if the side face 9a is defined by a convex curve as shown by broken line 9c, which corresponds to the FIG. 11 contour, when the tread wear progresses to for example 50% (such a state is shown by chain line M with two dots), the decrease GW0–GW2 in the width of the circumferential groove becomes very large, and the circumferential groove volume becomes very small. Therefore, the aquaplaning performance is greatly deteriorated.

In the present invention, however, by the provision of the concave side faces 9a and 9a, the groove width decrease GW0–GW1 in the 50% wear state becomes very small, and the volume of the circumferential groove is increased to improve the drainage, and the aquaplaning phenomenon is prevented.

Here, the "50% wear" means that the tread portion is worn and the circumferential groove 7 decrease its depth to 50% of the depth in the new tire state. The groove width is the minimum axially distance measured from the edge of the central portion 9 to the edge of the shoulder portion 8 in the foot print obtained under a 70% load state in which the tire is mounted on the standard rim and inflated to 70% of the maximum pressure and then loaded with 70% of the maximum tire load.

It is preferable that the groove width GW1 in the 50% wear state is in the range of from 0.84 to 0.92 times the groove width GW0 in the new state. If GW1 is less than 0.84 times GW0, the aquaplaning performance is liable to be deteriorated. If GW1 is more than 0.92 times GW0, it becomes difficult to provide a necessary rigidity for the central portion 9.

Further, to reduce the air resonance noise, the width GW0 of the circumferential groove 7 is preferably set in the range of 20 to 30% of the tread width TW.

Figure 4:
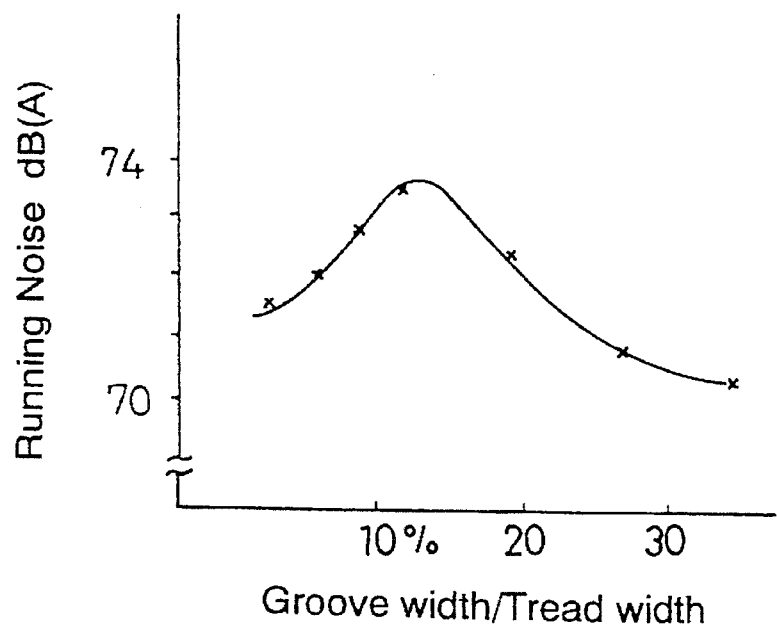
FIG. 4 is a graph showing the relationship between the running noise and groove width.

FIG. 4 shows the results of a noise test, wherein the running noise was measured, changing the groove width GW0, maintaining the groove depth constant. The test tires (size 205/55R15) were provided in the tread portion with a pair of circumferential grooves having a U-shaped sectional shape.

According to the "Test Procedure for Tire Noise" specified in Japanese JASO-C606, a 2000 cc passenger car provided with test tires was coasted for 50 meter distance at a speed of 60 km/h in a straight test course, and the maximum noise sound level was measured with a microphone set at 1.2 meter height from the road surface and 7.5 meter sideways from the running center line in the midpoint of the course.

As shown in FIG. 4, the noise became maximum when the ratio GW/TW of the groove width GW to the tread width TW was 13%, and it is preferable that the ratio is greater than 15%, more preferably greater than 20%.

Figure 5:
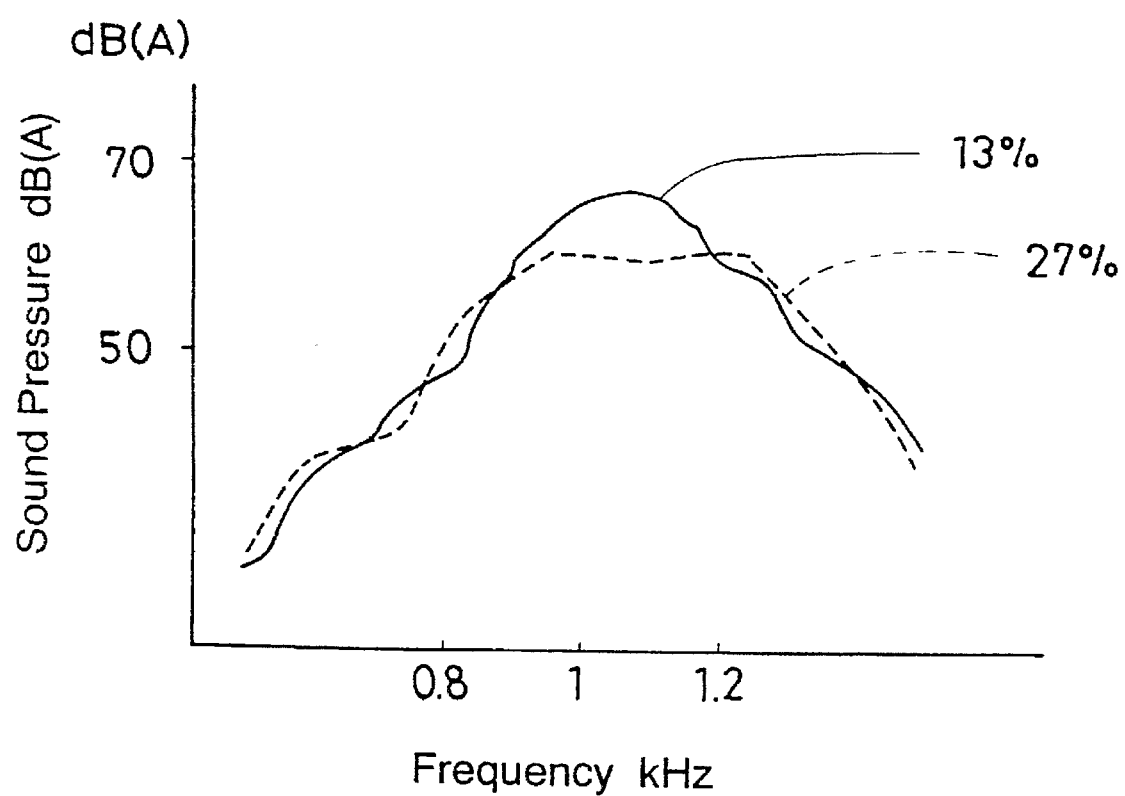
FIG. 5 is a graph showing the frequency spectrum.

FIG. 5 shows the frequency spectrum of the noise when the groove width ratio was 13% and 27%. When the ratio was 27%, the peak noise level at about 1 kHz was remarkably decreased in comparison with that of 13%.

Figure 6:
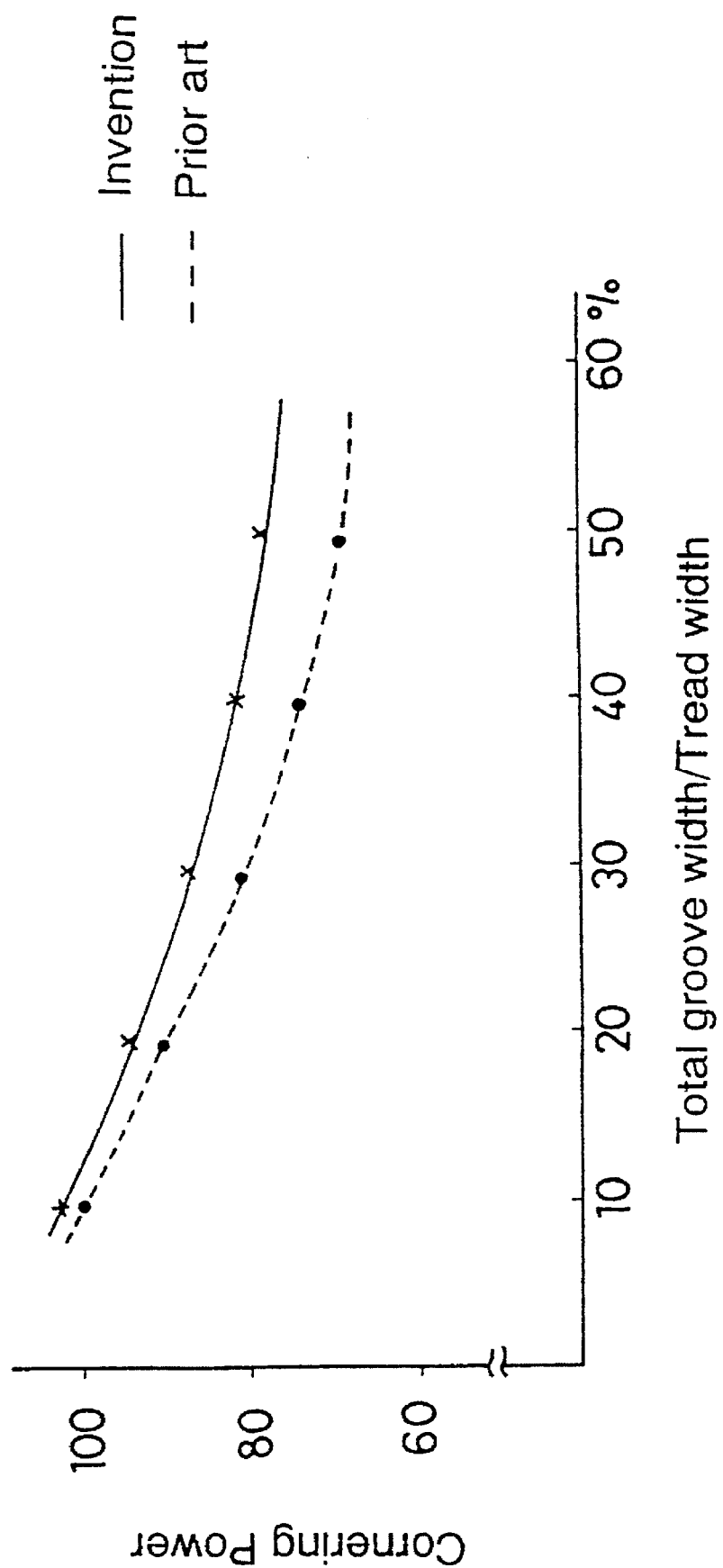
FIG. 6 is a graph showing the relationship between the cornering power and total groove width.

FIG. 6 shows the results of a cornering power test, in which the cornering power was measured with an indoor drum tester, changing the total width of the circumferential grooves 7.

Figure 2:
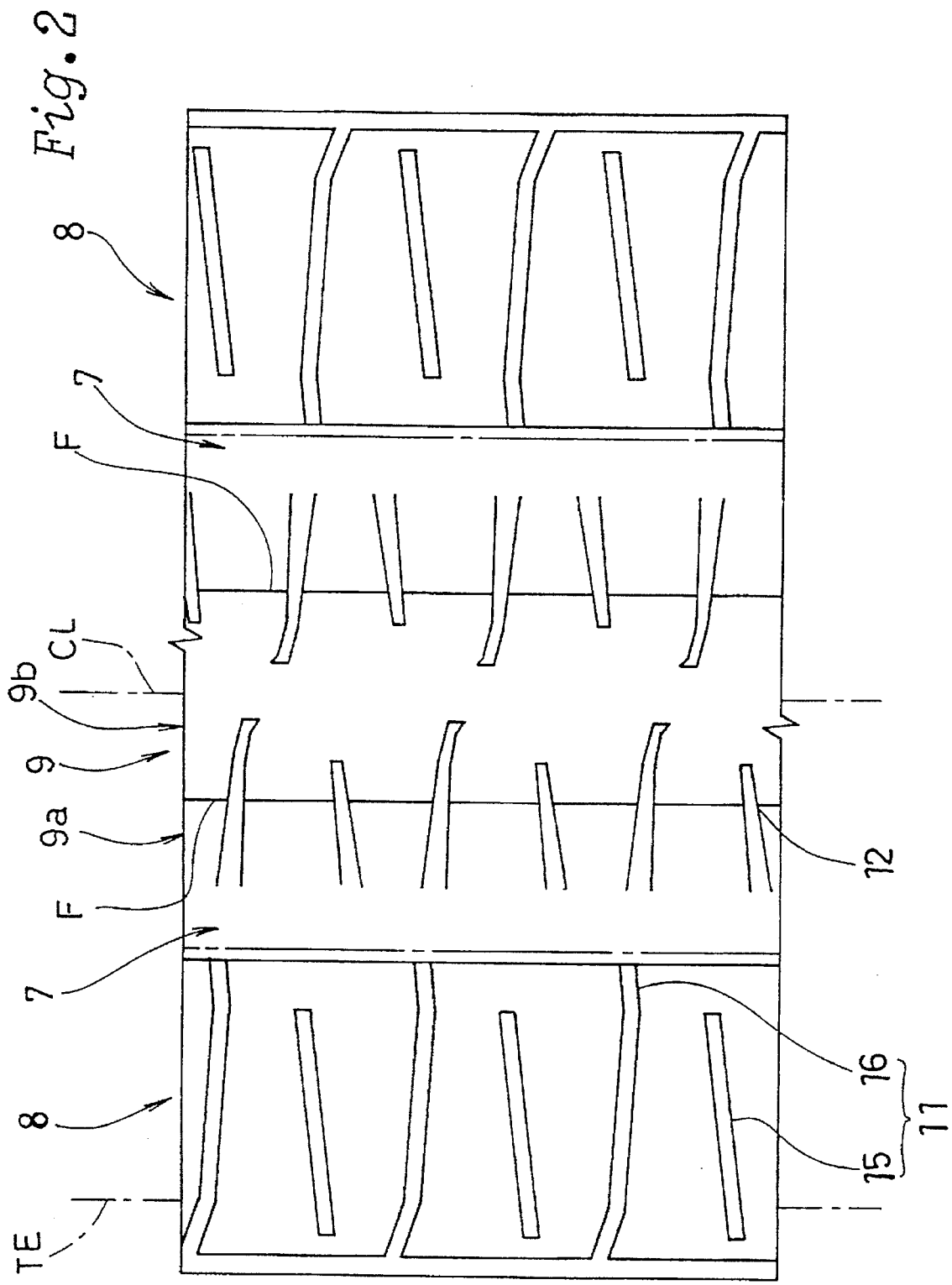
FIG. 2 is a partial plan view thereof showing the tread pattern.
Figure 9:
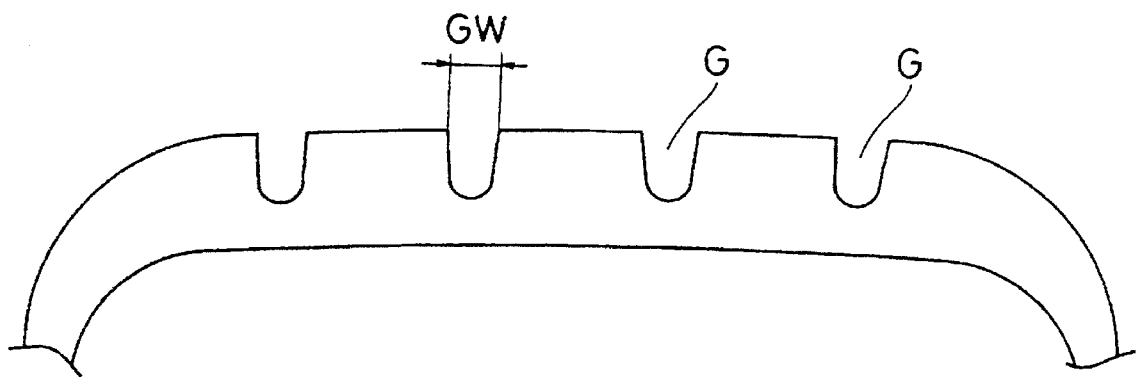
FIG. 9 is a cross sectional view of the tread portion of a prior art tire.
Figure 10:
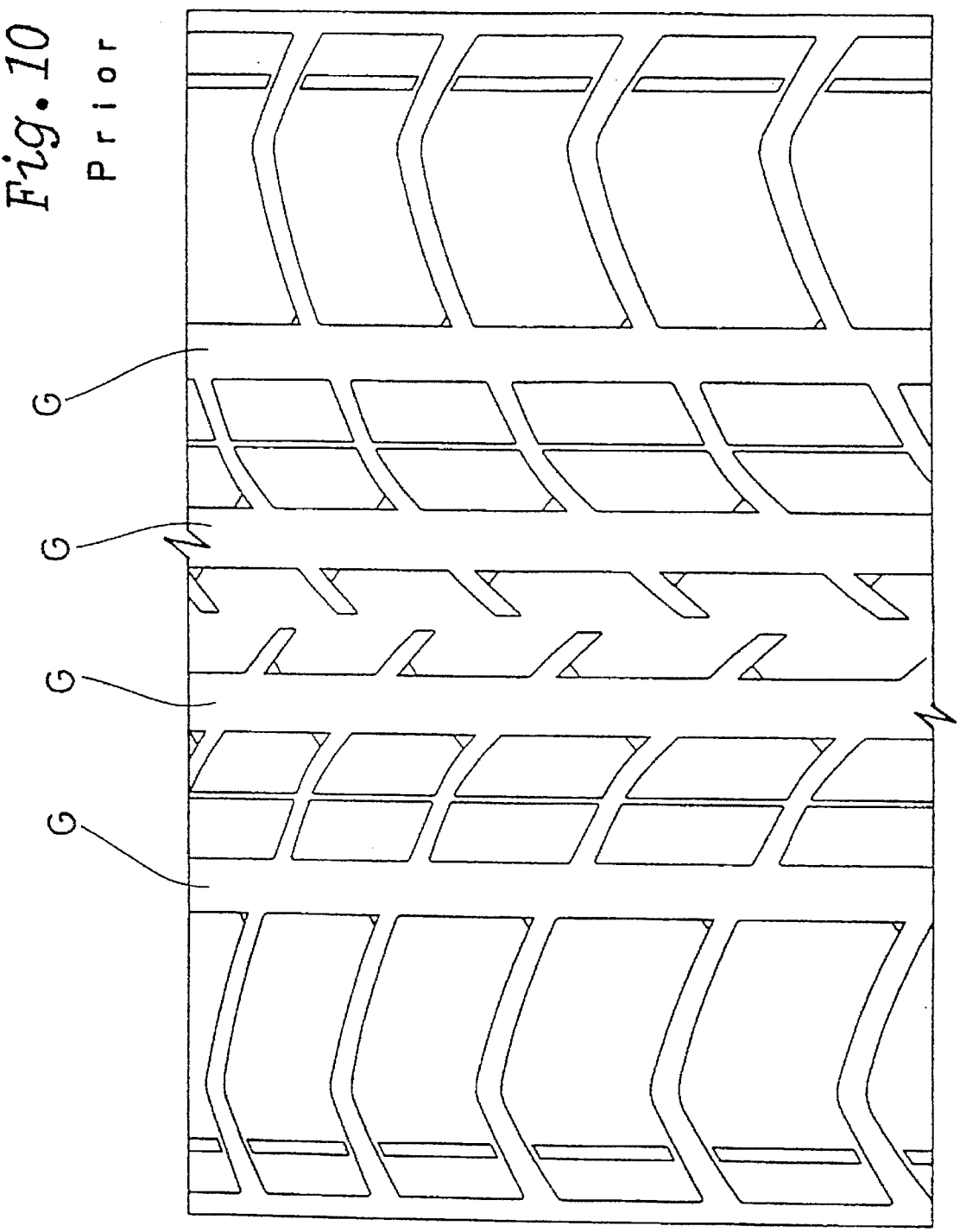
FIG. 10 is a partial plan view of the prior art tire.

The test tires used were the tire shown in FIGS. 1 and 2 (the total groove width=GW0×2) and a conventional tire shown in FIGS. 9 and 10 having four circumferential groove G (the total groove width=GW×4), which had the same tire size.

As shown in FIG. 6, from the test results, it was confirmed that the cornering power of the example tire is greater than that of the conventional tire. However, when the total groove width exceeds 50% of TW, the cornering power is greatly decreased.

Figure 7:
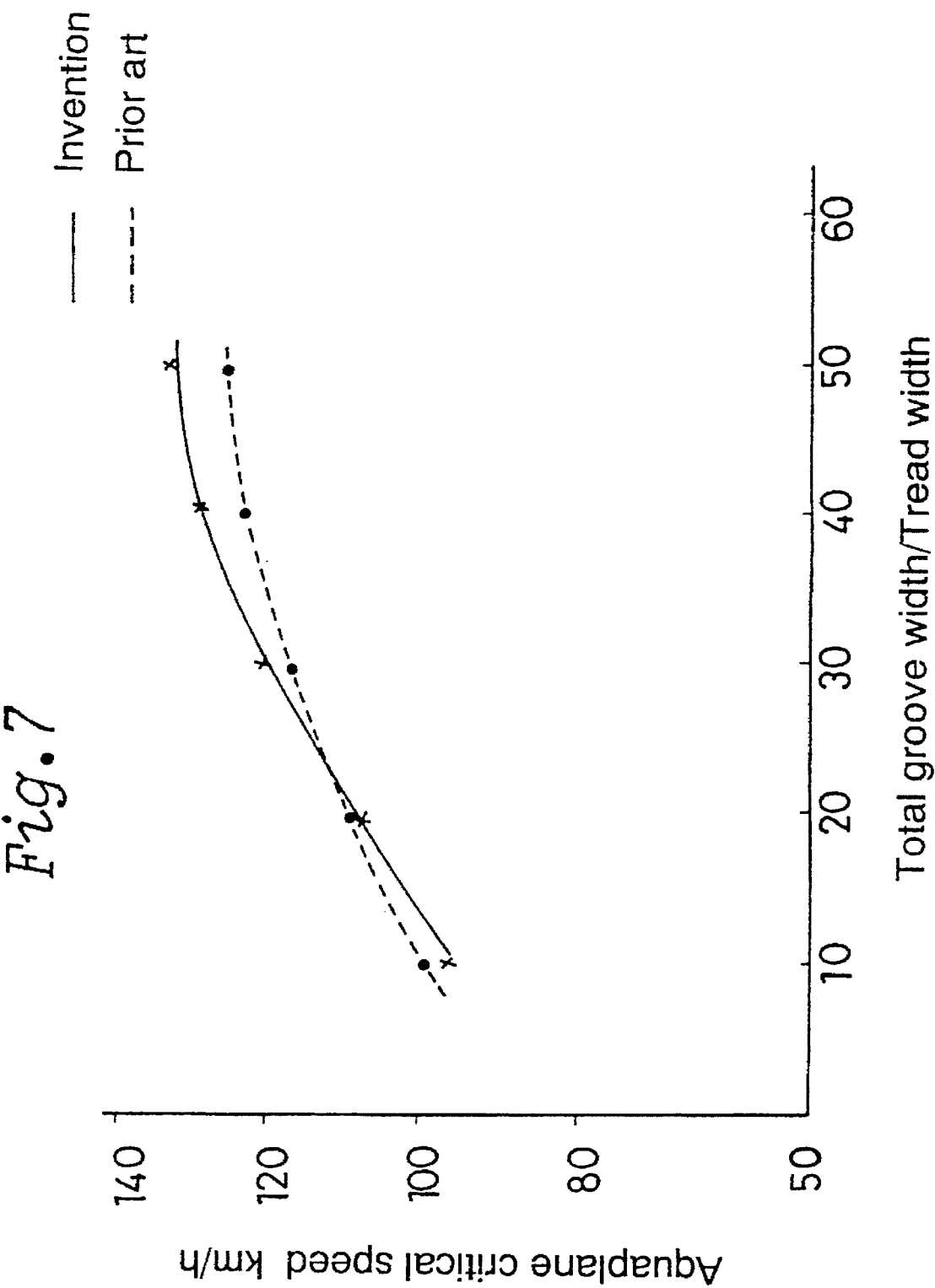
FIG. 7 is a graph showing the relationship between the critical speed for aquaplaning phenomenon and total groove width.
Figure 8:
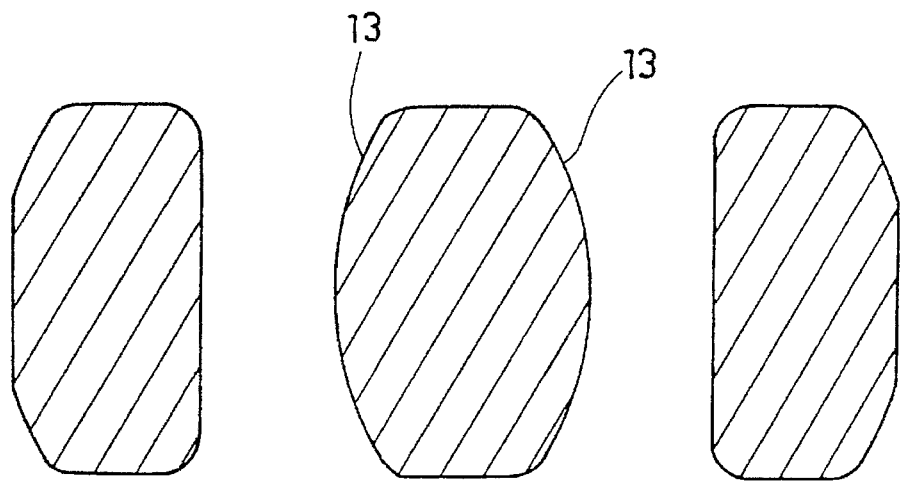
FIG. 8 is a schematic view showing the ground contacting area of the tread (foot print) of the embodiment of the present invention.

Further, changing the total width of the circumferential grooves, the critical speed for aquaplaning phenomenon was measured. The results are shown in FIG. 7.

From the test results, it was confirmed that when the total groove width is greater than about 25% of TW, the critical speed of the example tire is higher than that of the conventional tire.

Therefore, it is preferable that the width GW0 of each circumferential groove 7 is not less than 15% of the tread width TW, and the total of the widths GW0 of all the circumferential grooves 7 is in the range of from 30 to 50% of the tread width TW.

Further, the depth of each of the circumferential grooves 7 is preferably in the range of from 4 to 8% of the tread width TW.

In the embodiment shown in FIG. 1, the side face 9a and the central faces 9b are defined by a single radius arc. However, a multi radius arc, an ellipse, a curve closely resembling an ellipse may be used.

In the present invention, the shoulder portions 8 and central portion 9 can be provided with axially extending grooves to improve the wet grip performance and road grip.

FIG. 2 shows an example of the tread pattern including such axial grooves, wherein each shoulder portion 8 is provided with axial grooves 15 and 16. Each of the axial grooves 16 extends axially outwardly from one of the circumferential grooves 7 over the tread edge TE, with both the axial ends opened. Each of the axial grooves 15 extends axially outwardly from a position axially outward of the circumferential groove 7 to the tread edge TE, with both the axial ends closed.

The axial grooves 15 and the axial grooves 16 are arranged alternately in the tire circumferential direction, whereby the wet grip performance can be improved without decreasing the rigidity of the shoulder portion 8.

The central portion 9 is provided with axial grooves 12. Each of the axial grooves 12 has an axial inner end terminates near the equator CL and an axial outer end opened to one of the circumferential grooves 7.

No axial groove is provided near the tire equator CL, whereby the rigidity of the central portion is maintained, and a steering stability can be provided. As shown in FIG. 1, the axial groove 11(15 and 16) and 12 has a groove bottom 11a and 12a being substantially parallel with the belt 4.

The axially inner closed end 11b,12b of the axial groove 11,12 is parallel to the tire equator CL or inclined at a small angle (beta) of less than 15 degrees with respect to a radial line (Y). Therefore, when the tread wear is progressed, the length of the axial groove is hardly decreased, and the wet grip performance can be maintained.

Test tires of size 205/55R15 having specifications shown in Table 1 were tested for the aquaplaning performance and running noise.

Aquaplaning Performance Test

A test car provided on all the four wheels with test tires was run on a wet asphalt road with a water depth of 5 mm along a 100 meter radius circle at a speed of 70 kilometer/hour, and the maximum lateral-G was measured. The test results are shown in Table 1, wherein the results are indicated by an index based on that the conventional tire is 100. The larger the index, the higher the resistance to aquaplane.

From the test results, it was confirmed that the example tires according to the invention are superior in the aquaplaning performance to the reference tires in both the new tire state and 50% wear state. The running noise was also improved without sacrificing the aquaplaning performance.

As explained above, in the pneumatic tire according to the present invention, even if the tread wear is progressed, the wet grip performance can be maintained at an improved level, without deteriorating the dry grip performance and air resonance noise.

TABLE 1

| Tire | | Ex. 1 | Ex. 2 | Ex. 3 | Ref. 1 | Ref. 2 |
| --- | --- | --- | --- | --- | --- | --- |
| Tread width TW | (mm) | FIG. 1 | FIG. 1 | FIG. 1 | FIG. 9 | FIG. 11 |
| | | 168 | 168 | 168 | 168 | 168 |
| Central portion | | | | | | |
| Radius R1 | (mm) | 85 | 85 | 85 | — | 85 |
| R2 | (mm) | 25 | 15/160*[1] | 40 | — | — |
| Ground contacting width | (mm) | 38 | 38 | 38 | — | 38 |

TABLE 1-continued

| Tire | | Ex. 1 | Ex. 2 | Ex. 3 | Ref. 1 | Ref. 2 |
|---|---|---|---|---|---|---|
| Shoulder portion | | | | | | |
| Radius R3 | (mm) | 900 | 900 | 900 | 900 | 900 |
| Circumferential groove | | | | | | |
| Number | | 2 | 2 | 2 | 4 | 2 |
| Depth | (mm) | 8.4 | 8.4 | 8.4 | 8.4 | 8.4 |
| Width | | | | | | |
| New GW0 | (mm) | 38 | 38 | 38 | 9/9.5*2 | 38 |
| 50% wear GW1 | (mm) | 32 | 34 | 29 | — | — |
| 50% wear GW2 | (mm) | — | — | — | — | 27 |
| Width change from new to 50% wear | (%) | 16 | 11 | 24 | — | 29 |
| Test Result | | | | | | |
| Aquaplane | | | | | | |
| New | | 142 | 142 | 141 | 100 | 141 |
| 50% wear | | 99 | 103 | 94 | 77 | 90 |
| 50% wear/new | (%) | 70 | 73 | 67 | 77 | 64 |
| Running noise | | | | | | |
| New | dB(A) | −2.5 | −2.4 | −2.5 | 0 | −2.5 |

*1) double radius, axially inside/axially outside
*2) axially inner groove/axially outer groove

I claim:

1. A pneumatic tire comprising a tread portion, the tread portion provided with a pair of circumferential grooves extending substantially continuously in the circumferential direction of the tire, one circumferential groove of said pair of circumferential grooves being on one side of the tire equator and the other circumferential groove of said pair of said circumferential grooves being on the other side of said tire equator to divide the tread portion into a central portion between the circumferential grooves and a pair of shoulder portions axially outwards of the circumferential grooves, each shoulder portion of said pair of shoulder portions having a top face, the central portion having a contour comprising a central face defined by a continuous convex curve having axial edges and a pair of side faces each defined by a continuous concave curve, each of the side faces extending axially outwardly and radially inwardly from each of the axial edges of the central face towards the bottom of the adjacent circumferential groove, the side faces intersecting the convex central face at the axial edges to form an angle of less than 180 degrees, the central face of the central portion substantially inscribing an imaginary line which is drawn smoothly connecting top faces of the shoulder portions with each other so as to be tangent to the top faces of the shoulder portions at the axial inner edges of the shoulder portions and to be a straight line or a convex line having a single radius of curvature, the radius of curvature of the central face being smaller than a radius of curvature of the shoulder portions, and in the range of from 0.5 to 1.5 times the tread width, the axial width between the axial edges of the central face being in the range of from 15 to 35% of the tread width, in a standard condition in which the tire is mounted on a standard rim, and inflated to 70% of the maximum air pressure, and loaded with 70% of the maximum load, the footprint of the tire comprises a central part formed by said central portion and a pair of lateral parts formed by said shoulder portions, each of said lateral parts being separated from said central part by a void area which corresponds to one of the circumferential grooves, and the central part has curved edge lines and each of the lateral parts has a straight edge line so that, on each side of the tire equator, one of the void areas is defined by the straight edge line and one of the curved edge lines and the axial width between the straight edge line and said one of the curved edge lines is minimum in the circumferential center of the footprint and increases towards both ends thereof.

2. The pneumatic tire according to claim 1, wherein each of the side faces has a radius (R2) in the range of from 0.05 to 0.5 times the tread width (TW).

3. The pneumatic tire according to claim 1, wherein each of the side faces has a single radius (R2) in the range of from 0.05 to 0.5 times the tread width (TW).

4. The pneumatic tire according to claim 1, wherein the angle between the central face and each side face at their intersect is in the range of from 105 to 135 degrees.

5. The pneumatic tire according to claim 1, wherein under the standard condition, the axial width of each of the circumferential grooves in a new tire state is in the range of from 20% to 30% of the tread width (TW).

6. The pneumatic tire according to claim 1, wherein the axial width of each of the circumferential grooves under the standard condition is such that the width in a 50% wear state is not less than 84% of the width in a new tire state, the 50% wear state being such that the tread wear progresses to 50% of the depth of the circumferential groove.

7. The pneumatic tire according to claim 6, wherein the width in the 50% wear state is in the range of from 84 to 92% of the width in the new tire state.

8. The pneumatic tire according to claim 1, wherein the central portion is continuous in the circumferential direction.

9. The pneumatic tire according to claim 1, wherein in a tire meridian section, an axially inner side face of each shoulder portion extends straight at an inclination angle of 5 to 25 degrees with respect to a radial line, so as to form an edged corner between the inner side face and the top face.

* * * * *